(12) United States Patent
Kirsch

(10) Patent No.: US 7,877,989 B1
(45) Date of Patent: Feb. 1, 2011

(54) FILTER FOR VEHICLE EXHAUST SYSTEM

(76) Inventor: Billy Kirsch, 19010 N. 21st La., Phoenix, AZ (US) 85027

( * ) Notice: Subject to any disclaimer, the term of this patent is extended or adjusted under 35 U.S.C. 154(b) by 814 days.

(21) Appl. No.: 11/765,601

(22) Filed: Jun. 20, 2007

(51) Int. Cl.
*F01N 3/02* (2006.01)
(52) U.S. Cl. ............... 60/311; 60/272; 60/295; 60/297; 55/385.3; 55/DIG. 30
(58) Field of Classification Search ............ 60/272, 60/278, 295, 297, 311; 55/DIG. 30, 385.3
See application file for complete search history.

(56) References Cited

U.S. PATENT DOCUMENTS

| | | | |
|---|---|---|---|
| 3,645,098 A * | 2/1972 | Templin et al. ........... 60/288 |
| 3,757,521 A * | 9/1973 | Tourtellotte et al. ........... 60/274 |
| 4,894,071 A | 1/1990 | Klein |
| 4,913,034 A | 4/1990 | Ripple et al. |
| 5,307,627 A * | 5/1994 | Christensen et al. ........... 60/274 |
| 5,315,838 A | 5/1994 | Thompson |
| 5,953,909 A | 9/1999 | Waltrip, III |
| 6,164,063 A * | 12/2000 | Mendler ........... 60/274 |
| 6,598,388 B2 * | 7/2003 | Lucas et al. ........... 60/311 |
| 7,007,459 B2 * | 3/2006 | Lee ........... 60/281 |
| 7,132,047 B2 * | 11/2006 | Beard et al. ........... 210/203 |
| 7,174,705 B2 | 2/2007 | Binder et al. |
| 7,329,298 B1 * | 2/2008 | Hasinski ........... 55/385.3 |

* cited by examiner

*Primary Examiner*—Binh Q Tran
(74) *Attorney, Agent, or Firm*—Schmeiser Olsen & Watts LLP

(57) ABSTRACT

A vehicle exhaust system includes a catalytic converter connected to an exhaust pipe. An exhaust filter is connected to the exhaust pipe downstream from the catalytic converter. The exhaust filter is a charcoal filter that filters particulates from the air flow in the exhaust pipe. The exhaust filter is threadingly engaged with the exhaust pipe and is disposable.

20 Claims, 15 Drawing Sheets

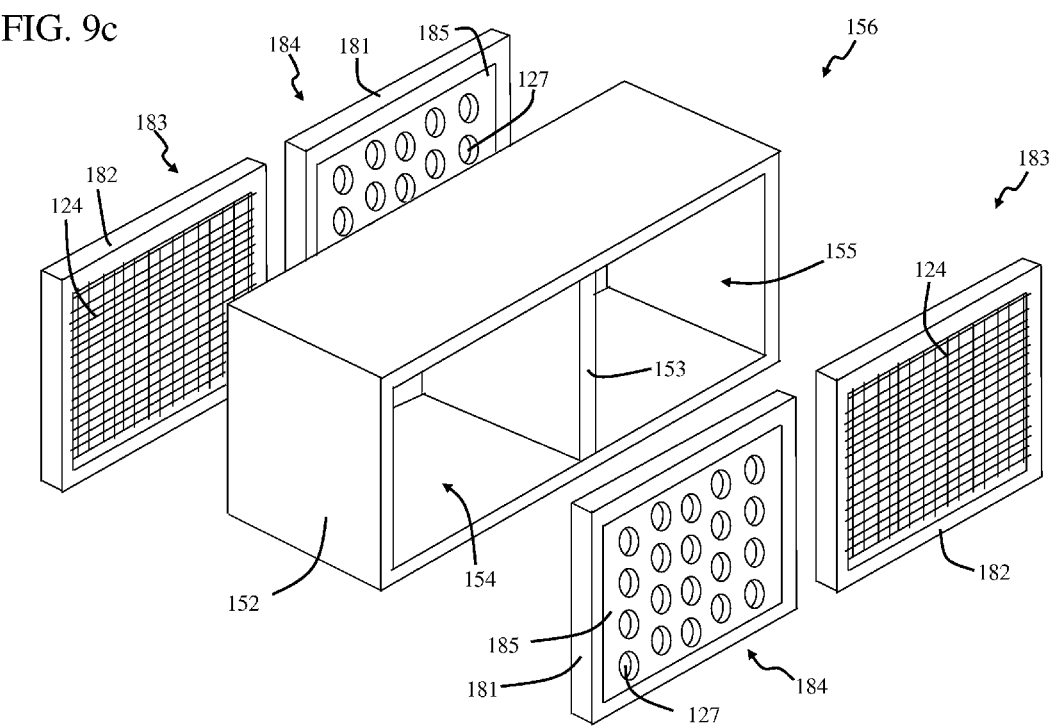

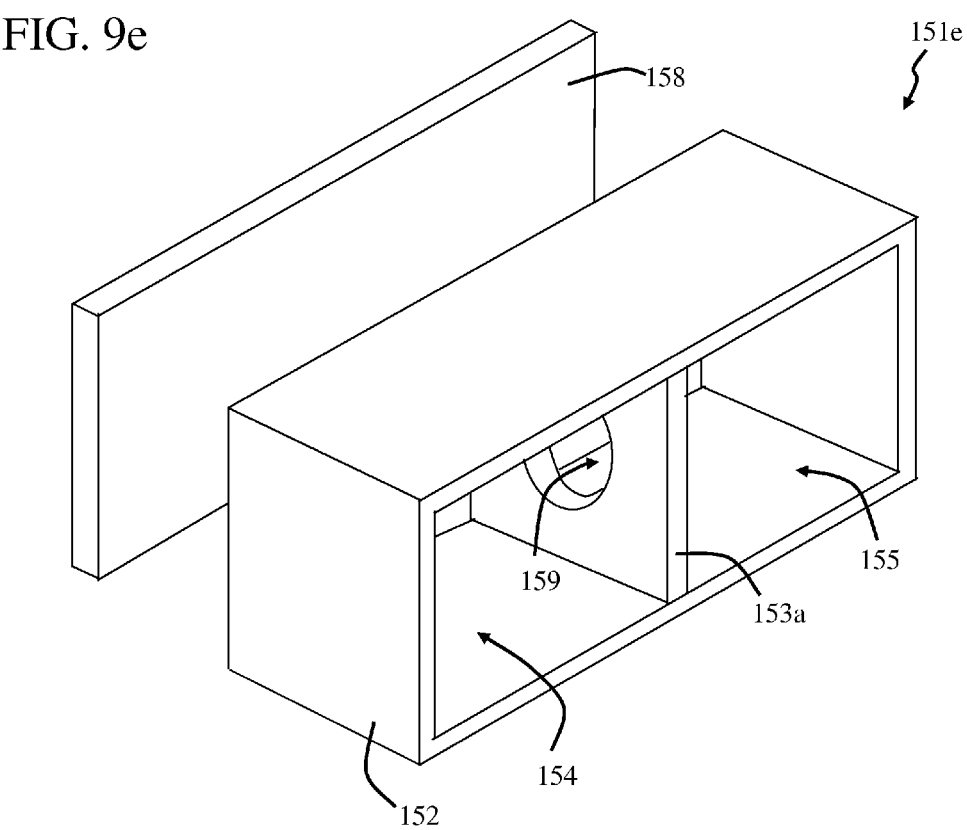

US 7,877,989 B1

FILTER FOR VEHICLE EXHAUST SYSTEM

BACKGROUND OF THE INVENTION

1. Field of the Invention

This invention relates generally to reducing the amount of pollutants expelled by a vehicle.

2. Description of the Related Art

It is well-known that vehicles powered by an internal combustion engine generate pollutants that are expelled through its exhaust system. It is useful to decrease the amount of pollutants expelled by the vehicle because of the negative environmental and health effects associated with them. The pollutants can be of many different types, such as gaseous carbon monoxide, hydrocarbons and nitrogen oxides, as well as solid particulate matter. Carbon monoxide is known to be a poisonous gas and hydrocarbons are known to include carcinogens, as well as photochemically active chemicals that cause the formation of ozone and smog. Further, nitrogen oxides are known to cause the formation of smog and acid rain. Solid particulate matter generally includes soot and hydrocarbons from uncombusted fuel, which can damage the lungs when inhaled.

Most vehicles include a catalytic converter to reduce the amount of pollutants expelled. The catalytic converter is included with the vehicle exhaust system and converts pollutants generated by the engine to less harmful chemical species. For example, the catalytic converter is effective at converting the pollutants to carbon dioxide, water and nitrogen. However, it is desirable to further reduce the amount of pollutants expelled by the vehicle.

BRIEF SUMMARY OF THE INVENTION

The present invention involves a vehicle engine which flows vehicle exhaust through a vehicle exhaust system. The vehicle exhaust system includes a catalytic converter operatively coupled with the vehicle engine. The catalytic converter receives engine exhaust from the vehicle engine and outputs a converter exhaust. In accordance with the invention, a charcoal exhaust filter is coupled with the catalytic converter and receives the converter exhaust. The charcoal exhaust filter filters pollutants from the converter exhaust and outputs a filter exhaust. The filter exhaust includes fewer pollutants than the converter exhaust and the converter exhaust includes fewer pollutants than the engine exhaust. In this way, the catalytic converter and charcoal exhaust filter reduce the amount of pollutants expelled by the vehicle.

These and other features, aspects, and advantages of the present invention will become better understood with reference to the following drawings and description.

BRIEF DESCRIPTION OF THE DRAWINGS

FIG. 9c is an exploded perspective view of another embodiment of an exhaust filter member which can be included with the exhaust filter of FIGS. 8a and 8b.

FIG. 9e is an exploded perspective view of an exhaust hollow body member included with the exhaust filter of FIGS. 8a and 8b.

DETAILED DESCRIPTION OF THE INVENTION

Figure 1:
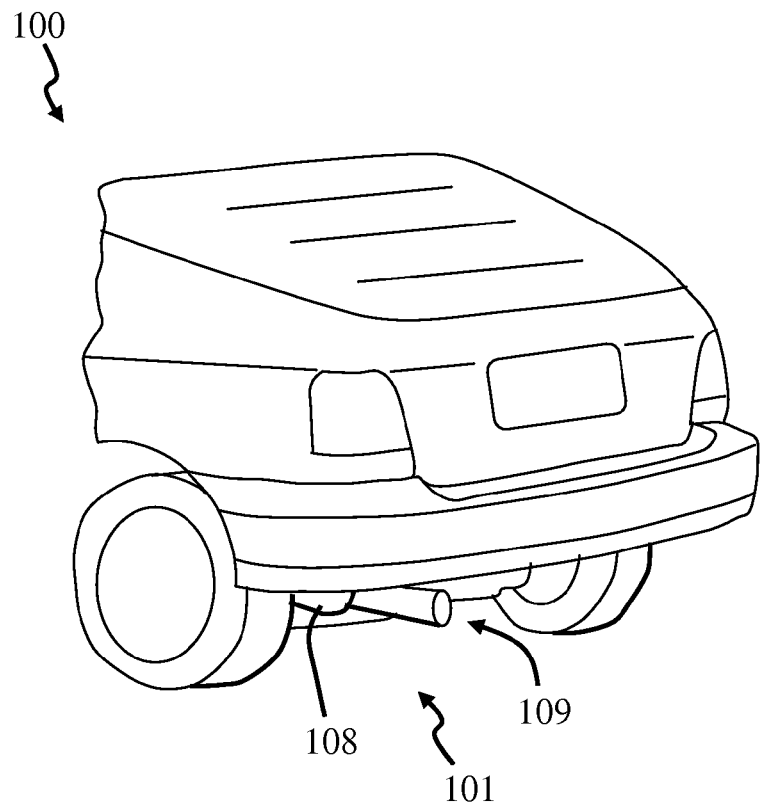
FIG. 1 is a rear perspective view of a vehicle operatively coupled with a vehicle exhaust system.

FIG. 1 is a rear perspective view of a vehicle 100 having a vehicle engine (not shown) operatively coupled with a vehicle exhaust system 101. Vehicle 100 can be of many different types, such as those in which the vehicle engine is an internal combustion engine. However, it should be noted that vehicle 100 can include other types of engines, such as a hybrid engine. A hybrid engine provides power from batteries and an internal combustion engine. Vehicles powered by batteries and an internal combustion engine are often referred to as "hybrid vehicles".

In accordance with the invention, vehicle exhaust system 101 includes an exhaust filter 108 connected to an exhaust pipe 109. Exhaust filter 108 receives pollutants from the vehicle engine in an engine exhaust gas and filters them before they are ejected through exhaust pipe 109. In this way, the amount of pollutants ejected by vehicle 100 is reduced.

In accordance with the invention, exhaust filter 108 uses a solid as the filtering agent. The solid filtering agent can be of many different types, such as rocks and/or charcoal. The rocks can be of many different types, such as lava rocks. The charcoal is typically activated charcoal because activated charcoal provides better pollution filtering than unactivated charcoal. Activated charcoal is charcoal that has been treated with oxygen to make it more porous. The charcoal can be treated in many different ways, such as by using physical reactivation and/or chemical activation.

There are many different types of activated charcoal that can be used in exhaust filter 108. For example, granulated activated carbon (GAC) is activated charcoal which includes a relatively larger particle size compared to powdered activated carbon and consequently, presents a smaller external surface. Powdered activated carbon (PAC) is activated charcoal which includes powders or fine granules less than about 1.0 millimeter (mm) in size with an average diameter between about 0.15 mm and 0.25 mm. Pelleted activated carbon is activated charcoal which includes extruded and cylindrically shaped activated carbon with diameters from about 0.8 mm to 5 mm. The carbon included with the charcoal can be impregnated with inorganic elements to increase the absorption of hydrogen sulfide and mercaptans in the engine exhaust gas. Examples of inorganic elements include iodine and silver, as well as cations, such as aluminum, manganese, and zinc.

Figure 2:
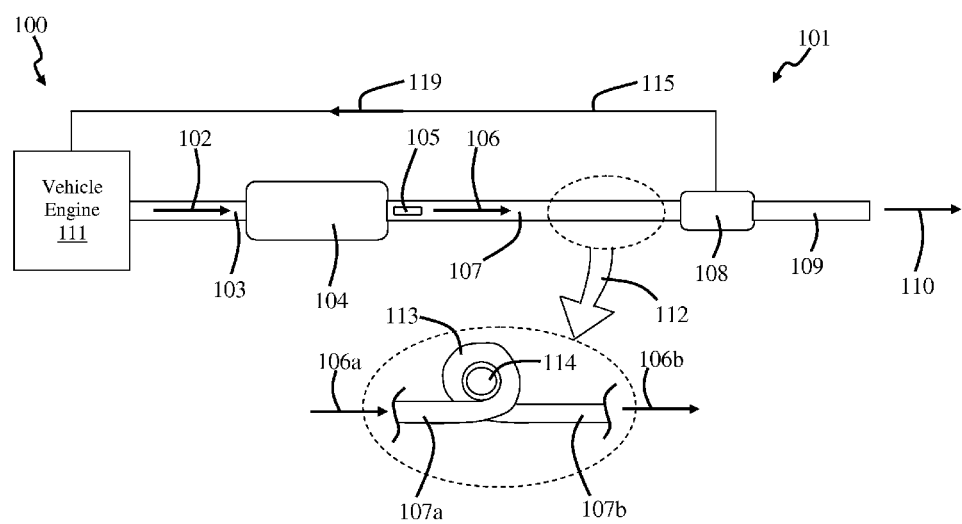
FIG. 2 is a schematic diagram of a vehicle with a vehicle exhaust system operatively coupled with a vehicle engine, in accordance with the invention.

FIG. 2 is a schematic diagram of vehicle 100 with vehicle exhaust system 101 operatively coupled with a vehicle engine 111. Vehicle exhaust system 101 is operatively coupled to vehicle engine 111 so that the engine exhaust gas generated from the operation of vehicle engine 111 flows through it. In this embodiment, vehicle exhaust system 101 includes an exhaust pipe 103 which connects a catalytic converter 104 to vehicle engine 111, so that engine exhaust 102 can flow therebetween. Catalytic converter 104 is connected to exhaust filter 108 through an exhaust pipe 107, so that a converter exhaust 106 can flow therebetween. Further, exhaust pipe 109 is connected to exhaust filter 108 (FIG. 1), so that filter exhaust 110 is expelled by vehicle 100. Exhaust filter 108 is connected to catalytic converter 104 downstream from it so that the engine exhaust gas flows from vehicle engine 111 to catalytic converter 104 through exhaust pipe 103, from catalytic converter 104 to exhaust filter 108 through exhaust pipe 107, and is expelled from exhaust filter 108 through exhaust pipe 109. In this embodiment, exhaust pipe 107 includes a cooling vent 105, which cools the exhaust gas as it flows through exhaust pipe 107. In this way, the exhaust gas is cooled as it flows between catalytic converter 104 and exhaust filter 108.

Exhaust pipe 107 can have many different configurations. For example, as indicated by a substitution arrow 112, exhaust pipe 107 can include exhaust pipe portions 107a and 107b with an exhaust loop portion 113 connected therebetween. In this embodiment, a flow rate adjuster 114 is coupled with exhaust loop portion 113 so it can adjust the flow rate of converter exhaust 106. In particular, flow rate adjuster 114 increases the flow of converter exhaust 106 to counteract the restriction of this flow rate by exhaust filter 108. Hence, a portion 106a of converter exhaust 106 flowing through exhaust pipe 107a has a smaller flow rate than a portion 106b of converter exhaust 106 flowing through exhaust pipe 107b. Flow rate adjuster 114 can be of many different types, such as a turbo fan.

A catalytic converter generally includes an autocatalyst, which is a substrate coated with a metal catalyst. The substrate is often a ceramic or metal block through which a honeycomb of channels extend. The channels can be coated with support materials to increase their surface area. The metal catalyst is generally platinum, but it can be other metal catalysts, such as palladium and rhodium. The autocatalyst is typically encased in a stainless steel housing and coupled to exhaust pipe 103 proximate to vehicle engine 111. The autocatalyst is known to reduce the negative effects of pollution in the exhaust gas. The autocatalyst reduces the negative effects of the pollution in many different ways, such as by oxidizing or reducing the pollutants to less harmful chemical species, such as carbon dioxide, water and nitrogen. Carbon dioxide, water and nitrogen are not as harmful as carbon monoxide, hydrocarbons, or nitrous oxide. However, it is also generally desirable to reduce the amount of these less harmful chemical species expelled by vehicle 100, as well as others, such as hydrogen sulfide. Further, it is also desirable to filter the pollutants that are not converted by catalytic converter 104. As discussed in more detail below, exhaust filter 108 reduces the amount of these less harmful chemical species expelled by vehicle 100 and filters pollutants that are not converted by catalytic converter 104.

In operation, catalytic converter 104 converts the chemical species in engine exhaust 102 to the less harmful pollutants, as discussed above, and expels a converter exhaust 106. Hence, converter exhaust 106 corresponds to engine exhaust 102 with a first amount of pollutants removed from it. Converter exhaust 106 is cooled by cooling vent 105 as it flows through exhaust pipe 107 to exhaust filter 108. Exhaust filter 108 receives converter exhaust 106 and filters and expels it through exhaust pipe 109 as filter exhaust 110. Filter exhaust 110 corresponds to converter exhaust 106 with a second amount of pollutants removed from it. In this way, catalytic converter 104 receives engine exhaust 102 and removes a first amount of pollutants from it and filter 108 receives converter exhaust 106 and removes a second amount of pollutants from it.

It should be noted that the amount of pollutants expelled by vehicle 100 can be further reduced. For example, a portion of converter exhaust 106 flowing through exhaust filter 108 can be flowed to an air intake (not shown) of vehicle engine 111. The portion of converter exhaust 106 flowed to the air intake goes through the combustion process again instead of being expelled through exhaust pipe 109. A portion of converter exhaust 106 can be flowed to the air intake of vehicle engine 111 in many different ways. In this embodiment, an exhaust pipe 115 is connected between exhaust filter 108 and vehicle engine 111 so that an exhaust gas 119 is flowed to the air intake. In this way, exhaust gas 119 is reused by engine 111 in the combustion process instead of being expelled through exhaust pipe 109. It should be noted that exhaust filter 108 can have many different configurations, one of which will be discussed in more detail presently.

Figure 3B:
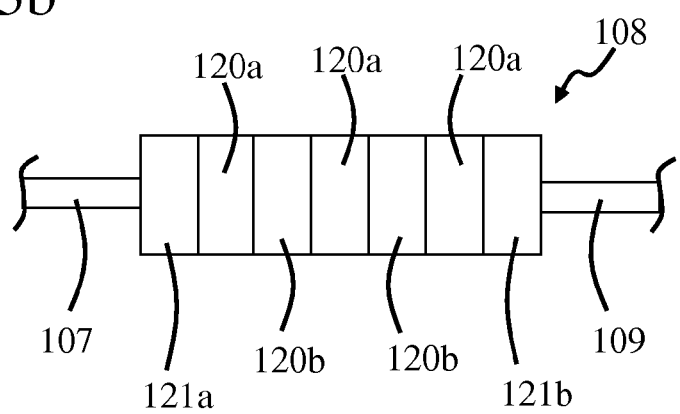
FIGS. 3a and 3b are perspective and plan views, respectively, of one embodiment of an exhaust filter, in accordance with the invention.
Figure 3A:
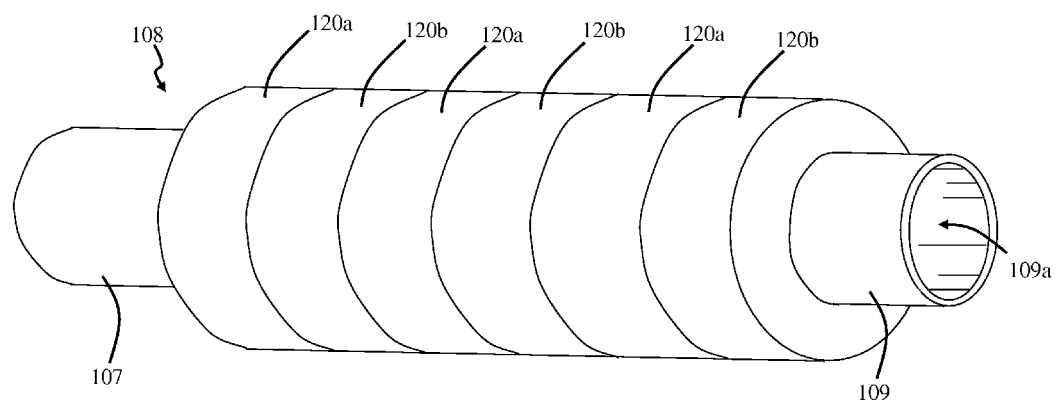

FIG. 3a is a perspective view of one embodiment of exhaust filter 108, in accordance with the invention. Filter 108 can have many different shapes, but here it is cylindrical. In this embodiment, exhaust filter 108 includes a filter member 120a, as well as a heat dissipation member 120b. Filter member 120a includes a solid filtering agent and heat dissipation member 120b includes a heat dissipation material. Heat dissipation member 120b is positioned between two filter members 120a or between one filter member 120a and exhaust pipe 109. Filter member 120a is positioned between two heat dissipation members 120b or between one heat dissipation member 120b and exhaust pipe 107. In this way, exhaust filter 108 includes alternating filter and heat dissipation members positioned between exhaust pipes 107 and 109. The filter and heat dissipation members filter and cool the exhaust gas as it flows through exhaust filter 108.

It should be noted that, in this embodiment, filter members 120a and heat dissipation members 120b are removeable from exhaust filter 108, so that they are disposable and replaceable. This is useful so that they can be replaced as their filtering and heat dissipation abilities diminish, which generally occurs with use. In other embodiments, however, filter members 120a and heat dissipation members 120b are a single integrated piece.

In operation, converter exhaust 106 flows through exhaust pipe 107 and into filter member 120a where it is filtered by the solid filtering agent included therein. Converter exhaust 106 then flows through heat dissipation member 120b where it is cooled by the heat dissipation material include therein. Converter exhaust 106 continues to flow through alternating members 120a and 120b, as described above, where it is alternately filtered and cooled. Hence, the engine exhaust gas alternates between being filtered and cooled until it flows into exhaust pipe 109 and is expelled by vehicle 100. It should be noted that exhaust filter 108 can have many other configurations, one of which will be discussed in more detail presently.

FIG. 3b is a plan view of another embodiment of exhaust filter 108, in accordance with the invention. In this embodiment, exhaust filter 108 includes alternating exhaust filter and heat dissipation members 120a and 120b, as in FIG. 3a. However, the alternating exhaust and heat dissipation members 120a and 120b are positioned between hollow body members 121a and 121b. In this way, exhaust pipe 107 is connected to a hollow body member at one end of exhaust filter 108 and exhaust pipe 109 is connected to a hollow body member at an opposed end of exhaust filter 108. Hollow body members 121a and 121b facilitate the connection of exhaust filter 108 to exhaust pipes 107 and 109. In this embodiment, hollow body members 121a and 121b do not include a solid filtering agent or heat dissipation material.

Figure 4A:
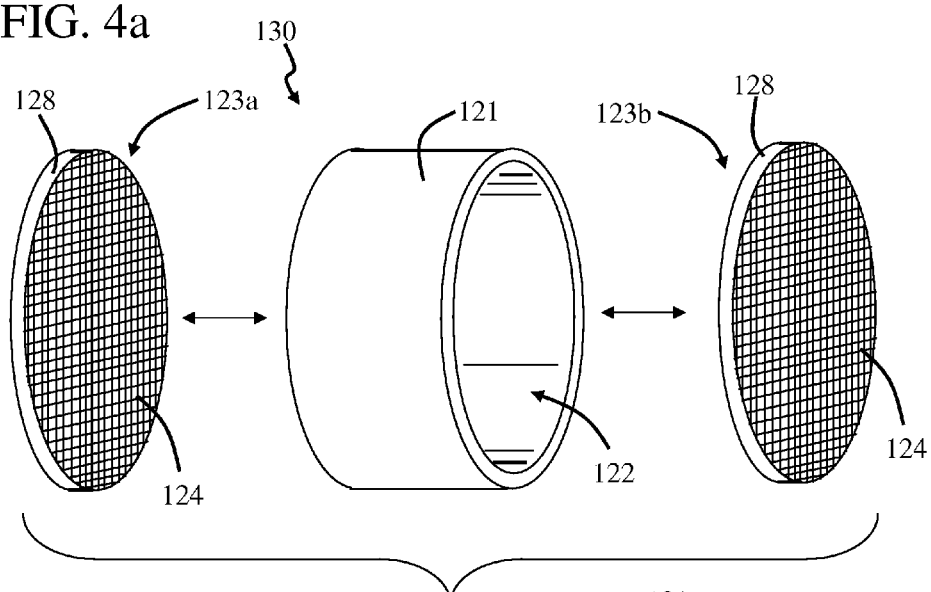
FIGS. 4a and 4b are exploded views of embodiments of an exhaust filter member, in accordance with the invention, included with FIGS. 3a and 3b.

FIG. 4a is an exploded view of an exhaust filter member 130, in accordance with the invention. In this embodiment, exhaust filter member 130 includes a hollow body member 121 with central opening 122 extending therethrough. Exhaust filter member 130 includes a screen 123a positioned at one end of central opening 122 and a screen 123b positioned at its opposed end. It should be noted that hollow body members 121a and 121b discussed above are the same as hollow body member 121.

Figure 5A:
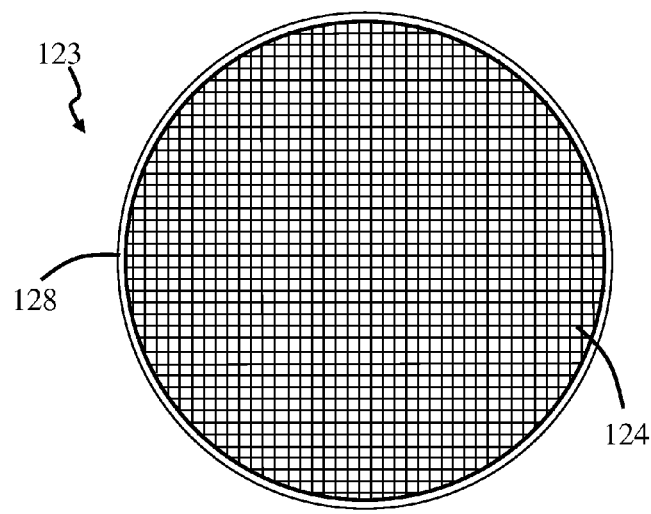
FIGS. 5a and 5b are plan views of a screen and flow diverter, respectively, included with the exhaust filter members of FIGS. 4a and 4b.

FIG. 5a is a plan view of a screen 123, which is the same or similar to screens 123a and 123b. In this embodiment, screen 123 includes an annular frame member 128 with a central opening covered with a mesh 124. Annular frame 128 can have many different shapes and dimensions, but here it is circular. Mesh 124 includes openings which allow the engine exhaust gas to flow therethrough.

It should be noted that exhaust filter member 130 (FIG. 4a) can be used as filter member 120a and/or heat dissipation member 120b, which were discussed in more detail above. When exhaust filter member 130 is used as exhaust filter member 120a, the solid filtering agent is positioned within opening 122 and held therein by screens 123a and 123b. The solid filtering agent can be of many different types, several of which were discussed above. The openings of mesh 124 are shaped and dimensioned to restrict the flow of the solid filtering agent therethrough.

When exhaust filter member 130 is used as heat dissipation member 120b, the heat dissipation material is positioned within opening 122 and held therein by screens 123a and 123b. The heat dissipation material can be of many different types, such as PYRON fibers provided by Zoltek Corporation of Abilene, Tex. The openings of mesh 124 are shaped and dimensioned to restrict the flow of the heat dissipation material therethrough.

Figure 4B:
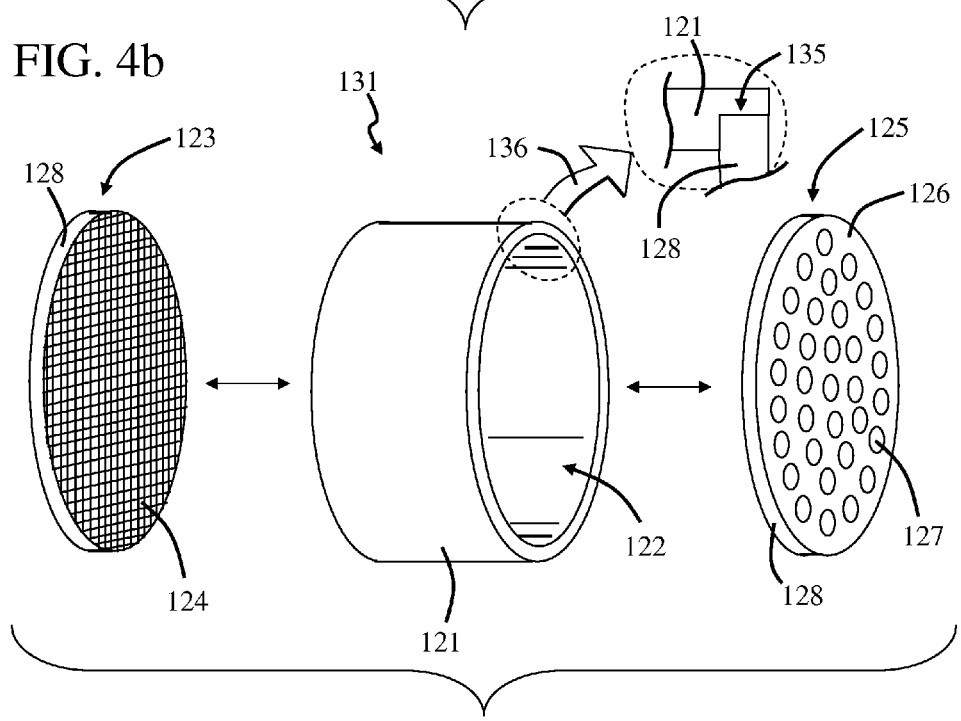

FIG. 4b is an exploded view of an exhaust filter member 131, in accordance with the invention. In this embodiment, exhaust filter member 131 includes hollow body member 121 with central opening 122. Exhaust filter member 131 includes a flow diverter 125 positioned at one end of central opening 122 and screen 123 positioned at the opposed end of central opening 122. It should be noted that the exhaust gas flow is generally through central opening 122 from flow diverter 125 to screen 123.

Figure 5B:
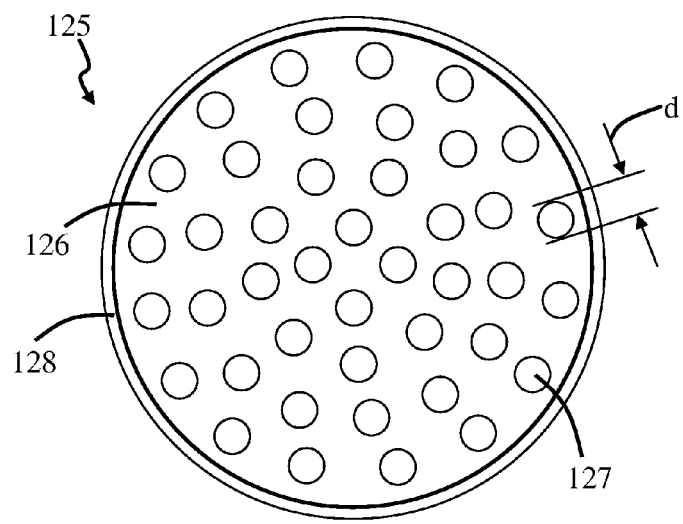

FIG. 5b is a plan view of one embodiment of flow diverter 125. In this embodiment, flow diverter 125 includes annular frame member 128 which carries a plate 126 with openings 127 extending therethrough. Plate 126 can have many different shapes and dimensions, but here it is circular and is dimensioned to cover opening 122. Further, openings 127 can have many different shapes and dimensions, but here they are circular with each having a diameter d. The exhaust gas flow through plate 126 increases as the number of openings 127 increases and the exhaust gas flow decreases as the number of openings decrease. Further, the exhaust gas flow through plate 126 increases as diameter d increases and the exhaust gas flow decreases as diameter d decreases. Diameter d is chosen to restrict the flow of the solid filtering agent and heat dissipation material through plate 126.

It should be noted that exhaust filter member 131 (FIG. 4b) can be used as filter members 120a and/or heat dissipation member 120b. When exhaust filter member 131 is used as filter member 120a, the solid filtering agent is positioned within opening 122 and held therein by screen 123 and flow diverter 125. Openings 127 and the openings of mesh 124 are shaped and dimensioned to restrict the flow of the solid filtering agent therethrough.

When exhaust filter member 131 is used as heat dissipation member 120b, the heat dissipation material is positioned within opening 122 and held therein by screen 123 and flow diverter 125. Openings 127 and the openings of mesh 124 are shaped and dimensioned to restrict the flow of the heat dissipation material therethrough. It should be noted that, however, that openings 127 can be covered with a mesh, if desired.

It should also be noted that, in some embodiments, hollow body member 121 can include a lip 135 which extends around the outer periphery of opening 122, as shown by a substitution arrow 136. Lip 135 is shaped and dimensioned to receive annular frame member 128. Body 121 can also include a lip (not shown) positioned on the opposed end of body 121 to receive the annular frame member of screens 123 and 123a. In this way, flow diverter 125 and screens 123 and 123a can be flush with body 121 when they are coupled together.

Figure 6A:
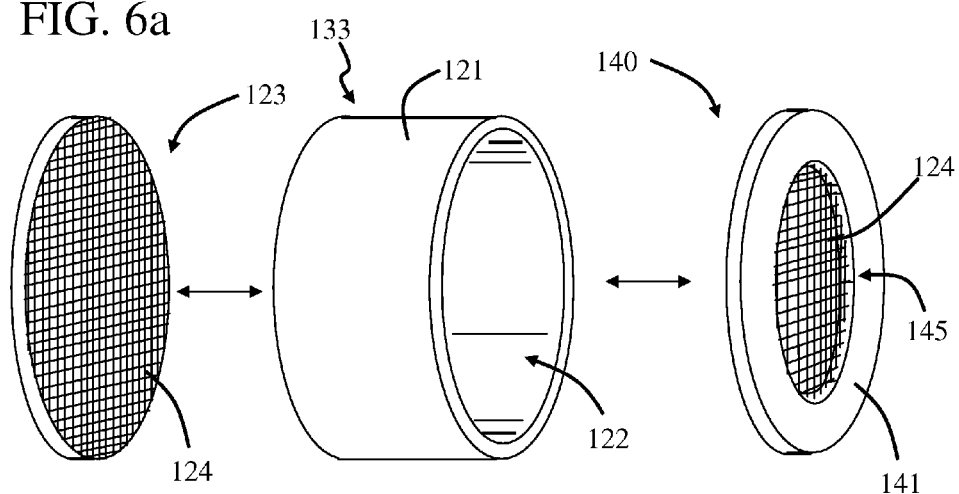
FIGS. 6a and 6b are exploded perspective views of two embodiments of an exhaust filter member, in accordance with the invention, which can be included with the exhaust filter of FIGS. 3a and 3b.

FIG. 6a is an exploded view of an exhaust filter member 133, in accordance with the invention. It should be noted that exhaust filter member 133 can be used as filter member 120a and/or heat dissipation member 120b, as discussed above in FIGS. 4a and 4b. In this embodiment, exhaust filter member 133 includes hollow body member 121 with central opening 122 extending therethrough. Screen 123 is positioned at one end of central opening 122 and a flow diverter 140 is positioned at its opposed end. In this embodiment, flow diverter 140 includes an annular plate 141 with a central opening 145 covered by mesh 124. Annular plate 141 blocks the flow of the exhaust gas so it is diverted to flow through central opening 145 and mesh 124. It should be noted that the exhaust gas flow through body 121 is generally from flow diverter 140 to screen 123.

Figure 6B:
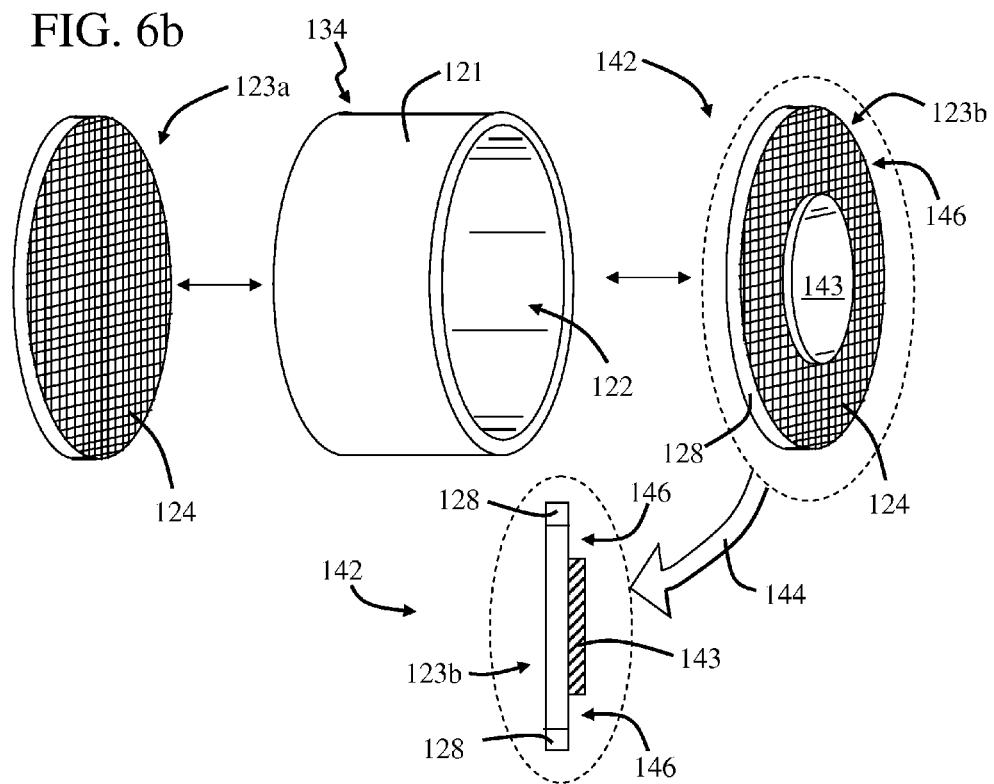

FIG. 6b is an exploded view of an exhaust filter member 134, in accordance with the invention. It should be noted that exhaust filter member 134 can be used as filter member 120a and/or heat dissipation member 120b, as discussed above in FIGS. 4a and 4b. In this embodiment, exhaust filter member 134 includes hollow body member 121 with central opening 122 extending therethrough. Screen 123a is positioned at one end of central opening 122 and a flow diverter 142 is positioned at its opposed end. It should be noted that the exhaust gas flow is generally from flow diverter 142 to screen 123. In this embodiment, flow diverter 142 includes screen 123b and, in accordance with the invention, a circular plate 143 is positioned on mesh 124 of screen 123b to form an outer annular opening 146 between plate 143 and annular frame 128. Outer annular opening 146 is best seen in a side view of flow diverter 142, as indicated by an indication arrow 144. Outer annular opening 146 is covered by mesh 124 of screen 123b and plate 143 diverts the flow of the exhaust gas to it.

It should be noted that exhaust filter 108 can be connected to exhaust pipes 107 and 109 in many different ways. For example, in some embodiments, exhaust filter 108 is welded to exhaust pipes 107 and/or 109 and, in other embodiments, exhaust filter 108 and exhaust pipes 107 and 109 are a single integral piece. In other embodiments, however, exhaust filter 108 is removeably coupled with exhaust pipes 107 and 109, as will be discussed presently.

Figure 7:
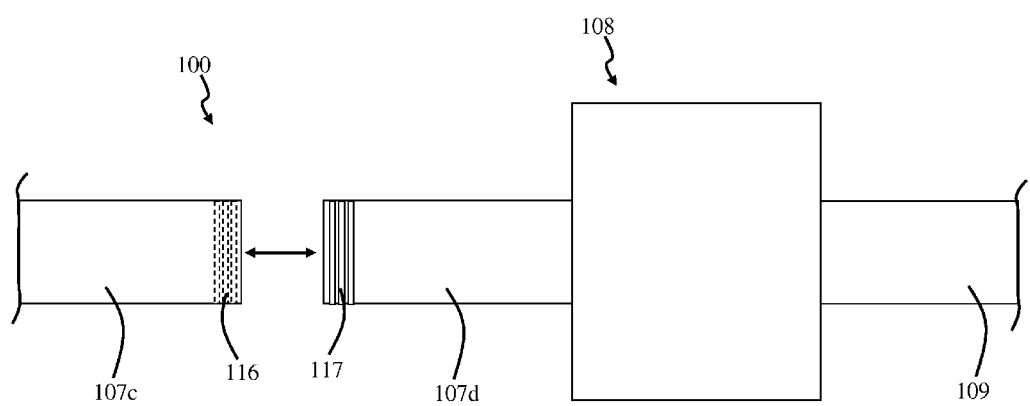
FIG. 7 is a side view of an embodiment of an exhaust filter, in accordance with the invention, threadingly engaged with an exhaust pipe.

FIG. 7 is a side view of an exhaust filter 108 which can be threadingly engaged with exhaust pipe 107, in accordance with the invention. In this embodiment, exhaust pipe 107 includes exhaust pipe portion 107c and exhaust pipe portion 107d. Exhaust filter 108 is connected to exhaust pipe portion 107d, wherein exhaust pipe portion 107d includes threads 117 on its end opposed to filter 108. Exhaust pipe portion 107c includes threads 116, wherein threads 117 can be threadingly engaged with threads 116. In this way, filter 108 is connected to exhaust pipe 107 in a repeatably removeable manner.

Figure 8A:
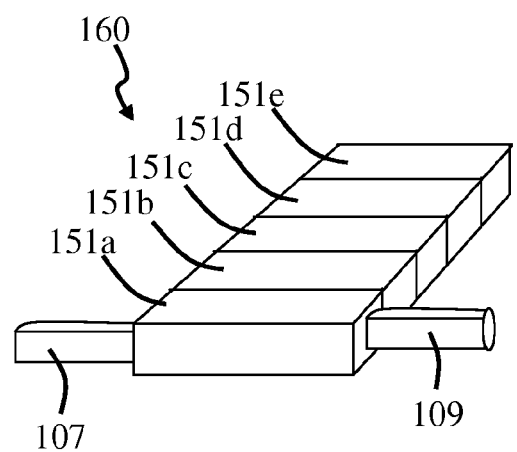
FIGS. 8a and 8b are perspective and plan views, respectively, of another embodiment of an exhaust filter, in accordance with the invention.
Figure 8B:
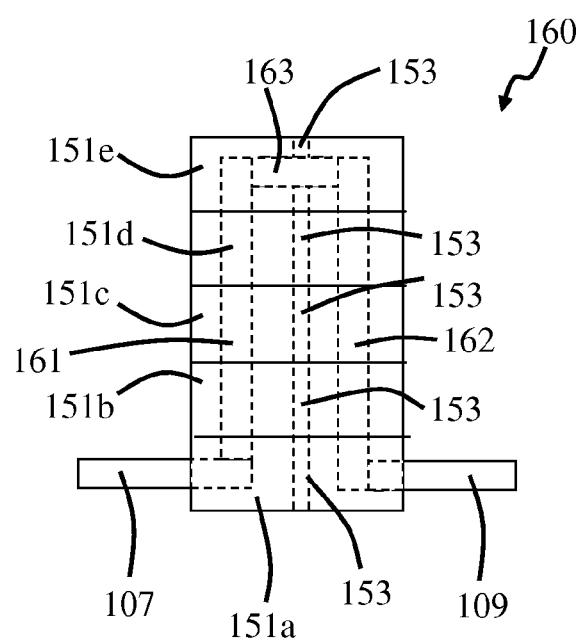

FIGS. 8a and 8b are perspective and plan views, respectively, of an exhaust filter 160, in accordance with the invention, which can replace exhaust filter 108. Exhaust filter 160 can be of many shapes, but here it has a rectangular cross-section and defines a cubic volume. In this embodiment, exhaust filter 160 includes hollow body members 151a and 151e, with exhaust filter members 151b, 151c, and 151d positioned between them. Hollow body member 151a is attached to exhaust pipes 107 and 109 at its opposed ends.

As best seen in FIG. 8b, exhaust filter 160 includes exhaust flow paths 161 and 162 which extend through members 151a-151e. Further, exhaust filter 160 includes exhaust flow path 163 which extends through member 151e and connects exhaust flow paths 161 and 162 together. Exhaust flow paths 161 and 162 are separated from each other by a sidewall 153 and the flow of exhaust gas through paths 161 and 162 is in opposed directions. Exhaust flow path 163 extends through an opening (not shown) in sidewall 153.

Exhaust pipe 107 is connected to the end of exhaust flow path 161 opposed to exhaust flow path 163 and exhaust pipe 109 is connected to the end of exhaust flow path 162 opposed to exhaust flow path 163. In this way, exhaust gas flowing through exhaust pipe 107 flows to exhaust flow path 163 through exhaust flow path 161. Further, the exhaust gas flowing through exhaust flow path 163 flows to exhaust pipe 109 through exhaust flow path 162.

In accordance with the invention, filter members 151b, 151c and 151d are alternating filter and heat dissipation members. Hence, the exhaust flow through exhaust flow paths 161 and 162 flow through alternating filter and heat dissipation regions. Members 151a-151e can have many different configurations, several of which will be discussed in more detail presently.

Figure 9A:
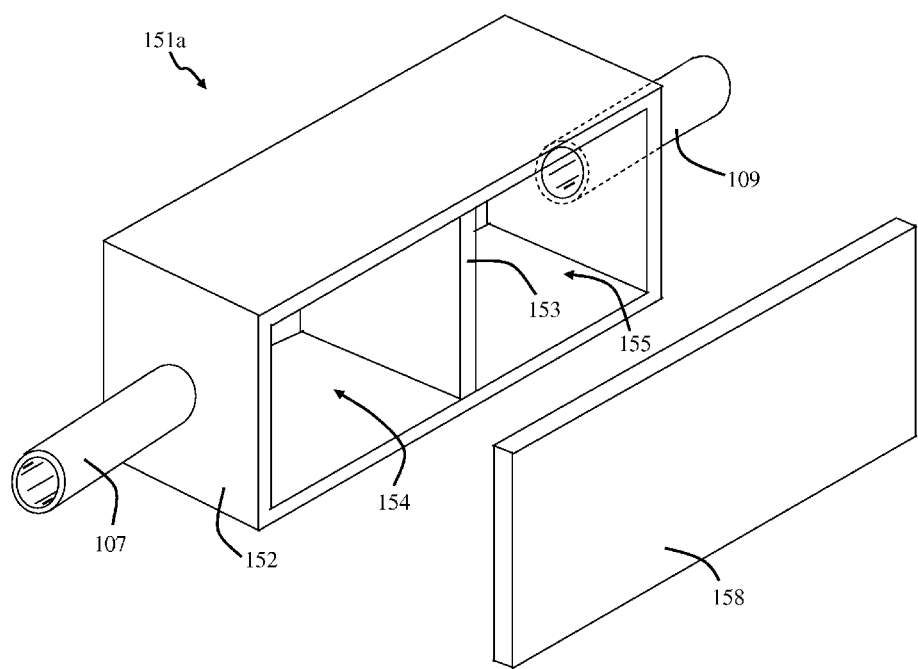
FIG. 9a is an exploded perspective view of an exhaust hollow body member included with the exhaust filter of FIGS. 8a and 8b.

FIG. 9a is an exploded perspective view of one embodiment of hollow body member 151a, in accordance with the invention. In this embodiment, hollow body member 151a includes body member 152 with openings 154 and 155 extending therethrough and separated from each other by sidewall 153. It should be noted that openings 154 and 155 correspond to exhaust flow paths 161 and 162, respectively. Hollow body member 151a includes a sidewall 158 which extends perpendicular to sidewall 153. Sidewall 158 prevents exhaust gas flow through one end of openings 154 and 155. It should be noted that sidewall 158 and hollow body 152 are shown here as being separate pieces, but they can be a single integrated piece in other embodiments. As mentioned above, exhaust pipes 107 and 109 are positioned on opposed ends of hollow body 152, and extend therethrough so they are in fluid communication with openings 154 and 155, respectively, as well as exhaust flow paths 161 and 162, respectively.

Figure 9B:
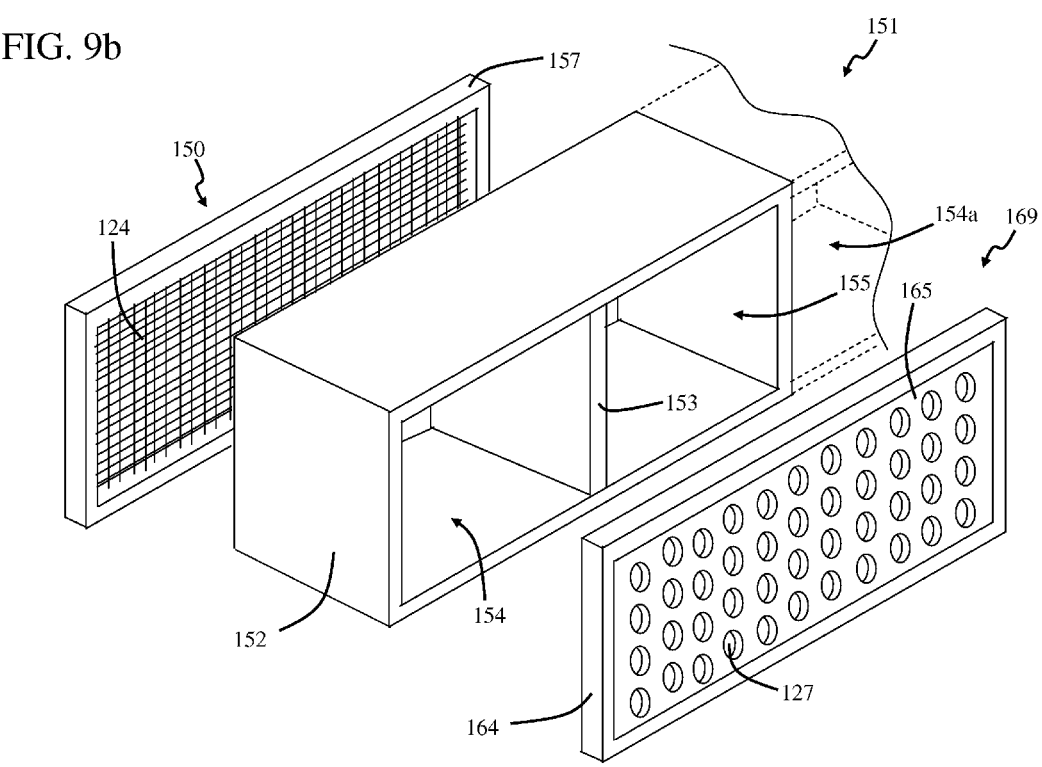
FIG. 9b is an exploded perspective view of an exhaust filter member included with the exhaust filter of FIGS. 8a and 8b.

FIG. 9b is an exploded perspective view of exhaust filter member 151, in accordance with the invention. In this embodiment, exhaust filter member 151 includes body member 152 with openings 154 and 155 extending therethrough and sidewall 153 positioned therebetween. Exhaust filter member 151 includes a screen 150 positioned at one end of openings 154 and 155 and a flow diverter 169 positioned at their opposed ends. Screen 150 and flow diverter 169 are each single pieces which cover openings 154 and 155. However, it should be noted that screen 150 can be replaced by a smaller screen that covers only opening 154 or 155. Further, flow diverter 169 can be a smaller flow diverter that covers only opening 154 or 155. Examples of embodiments of smaller screens and flow diverters are shown in FIG. 9c.

Openings 154 and 155 of exhaust filter member 151 correspond to exhaust flow paths 161 and 162, respectively. Further, openings 154 and 155 of exhaust filter member 151 are in fluid communication with openings 154 and 155 of hollow body member 151a. Sidewall 153 of exhaust filter member 151 is engaged with sidewall 153 of hollow body member 151a so they form a single sidewall which restricts the flow of exhaust gas between exhaust flow paths 161 and 162.

In this embodiment, screen 150 includes a rectangular frame member 157 which carries mesh 124. Further, flow diverter 169 includes a rectangular frame member 164 which carries a diverter plate 165 with openings 127 extending therethrough. It should be noted that body member 152 can include lips (not shown), such as lip 135, for receiving screen 150 and flow diverter 169.

Figure 10A:
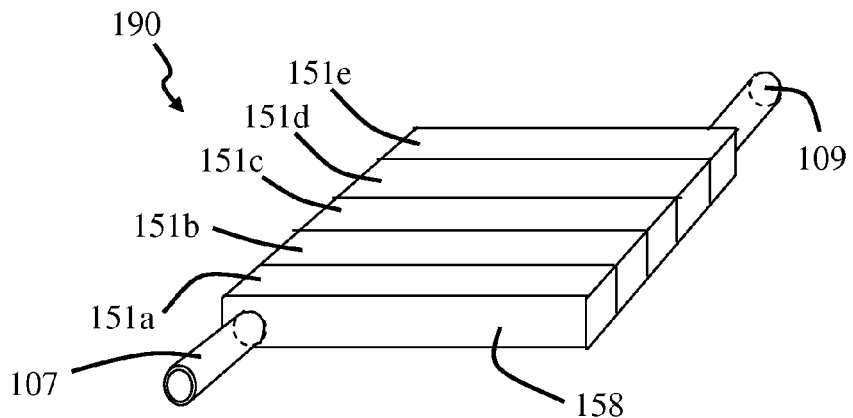
FIGS. 10a and 10b are perspective and plan views, respectively, of another embodiment of an exhaust filter, in accordance with the invention.
Figure 10B:
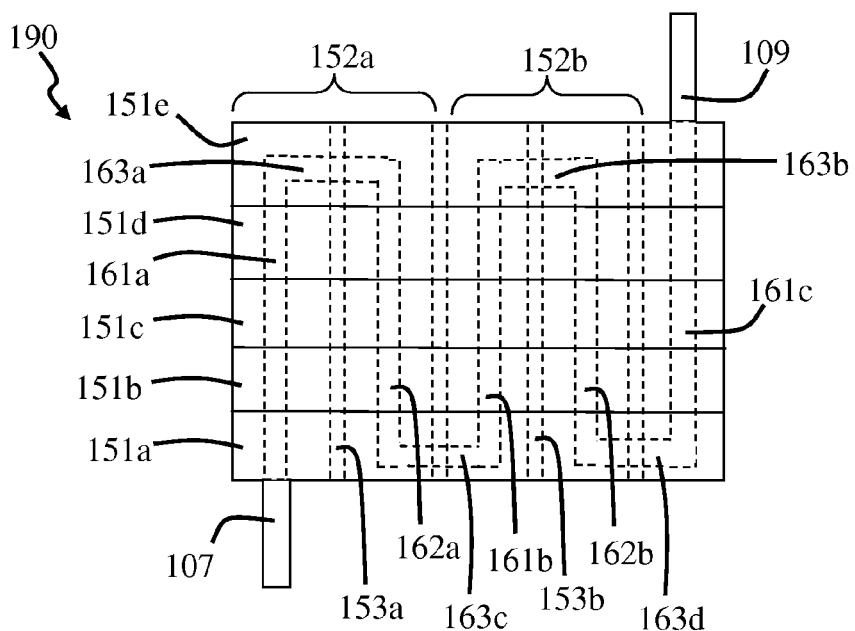

It should also be noted that exhaust filter member 151 can be extended to include additional openings in rectangular body 152, an example of which is indicated in phantom and designated as opening 154a. An exhaust filter member that is extended to include additional openings would generally include additional sidewalls separating the openings. It should be noted that the number of openings 154 and 155 included with hollow body member 151a generally corresponds to the number of openings 154 and 155 included with exhaust filter member 151. One such example of an exhaust filter member that has been extended to include additional openings is shown in FIGS. 10a and 10b.

In accordance with the invention, exhaust filter member 151 can include the solid filtering agent and/or the heat dissipation material. For example, in one embodiment, the solid filtering agent is positioned in openings 154 and 155 and held therein by screen 150 and flow diverter 169. In this way, exhaust filter member 151 operates as an exhaust filter. In another embodiment, the heat dissipation material is positioned in openings 154 and 155 and held therein by screen 150 and flow diverter 169. In this way, exhaust filter member 151 operates as a heat dissipation member. It should be noted that the solid filtering agent can be positioned in opening 154 and the heat dissipation material can be positioned in opening 155. Further, the solid filtering agent can be positioned in opening 155 and the heat dissipation material can be positioned in opening 154. In this way, exhaust filter member 151 operates as both a filter and heat dissipation member.

FIG. 9c is an exploded perspective view of an exhaust filter member 156, in accordance with the invention, which includes smaller screens and flow diverters. In this embodiment, exhaust filter member 156 includes a flow diverter 184 that includes a square frame 181 which carries a square plate

185 with openings 127 extending therethrough. Further, exhaust filter member 156 also includes a square screen 183 with a square frame 182 which carries mesh 124.

Figure 9D:
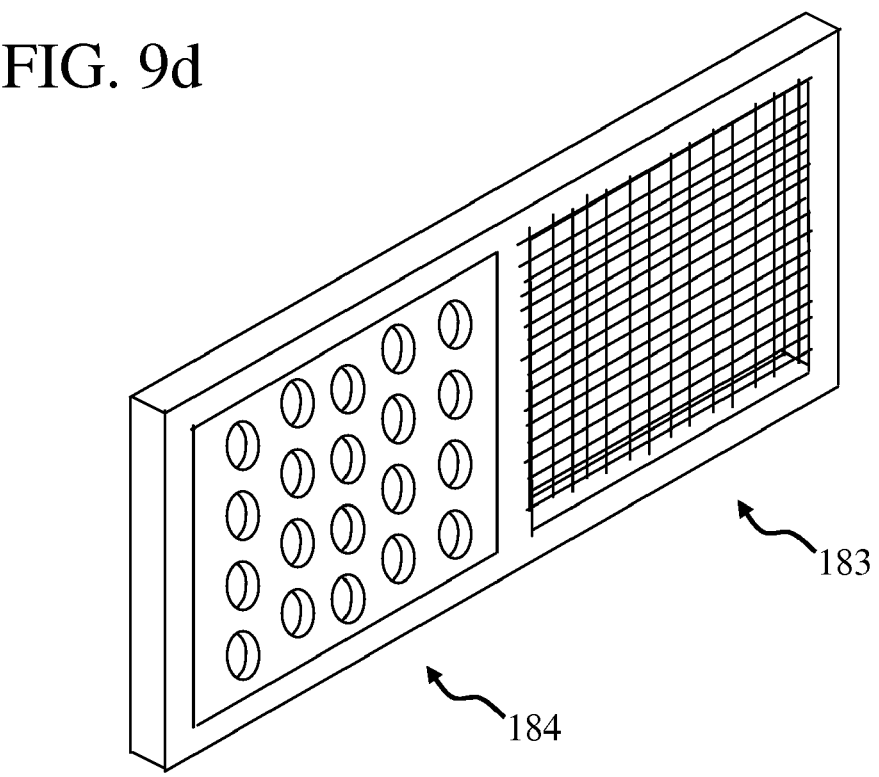
FIG. 9d is a perspective view of a screen and gas flow diverter formed as a single integral piece, in accordance with the invention.

In this embodiment, screen 183 and flow diverter 184 can be positioned in many ways. For example, flow diverter 184 is engaged with screen 183 and positioned at one end of openings 154 and 155. Further, another one of flow diverter 184 is engaged with another one of screen 183 and they are positioned at the opposed end of openings 154 and 155. In this particular embodiment, screen 183 faces flow diverter 184 at opposed ends of openings 154 and 155. It should be noted that screen 183 and flow diverter 184 can be connected together so they form a single integral piece, as shown in FIG. 9*d*.

FIG. 9*e* is an exploded perspective view of hollow body member 151*e*, in accordance with the invention. In this embodiment, hollow body member 151*e* includes hollow body 152 with openings 154 and 155 extending therethrough and separated from each other by sidewall 153. Openings 154 and 155 correspond to exhaust flow paths 161 and 162, respectively. Sidewall 153 includes an opening 159 so that openings 154 and 155 are in fluid communication with each other and opening 159 corresponds to exhaust flow path 163. Hollow body member 151*e* includes sidewall 158 positioned at one end of openings 154 and 155. Sidewall 158 extends perpendicular to sidewall 153 and prevents exhaust gas flow through one end of openings 154 and 155. It should be noted that sidewall 158 and hollow body 152 are shown here as being separate pieces, but they can be a single integrated piece in other embodiments. It should be noted that the number of openings 154 and 155 included with hollow body member 151*e* generally corresponds to the number of openings 154 and 155 included with exhaust filter member 151.

FIGS. 10*a* and 10*b* are perspective and plan views, respectively, of a filter 190, in accordance with the invention, which can replace exhaust filter 108. In this embodiment, filter 190 has been extended to include additional openings, as denoted by rectangular bodies 152*a* and 152*b*, wherein bodies 152*a* and 152*b* are the same as rectangular body 152, but with a common sidewall. In this embodiment, exhaust pipe 107 extends through sidewall 158 and is in fluid communication with exhaust flow path 161*a*. Exhaust flow path 163*a* extends through sidewall 153*a* so it connects exhaust flow path 161*a* to exhaust flow path 162*a*. It should be noted that exhaust flow paths 161*a*, 162*a* and 163*a* correspond to exhaust flow paths 161, 162 and 163, respectively, of FIG. 8*b*.

An exhaust flow path 163*c* extends from the end of exhaust flow path 162*a* opposed to exhaust flow path 163*a* and into rectangular body 152*b*, where it is in fluid communication with an exhaust flow path 161*b*. Exhaust flow path 161*b* extends through members 151*a*-151*e* of body 152*b*, where it is in fluid communication with an exhaust flow path 163*b*. Exhaust flow path 163*b* extends through a sidewall 153*b* of rectangular body 152*b* and connects exhaust flow path 161*b* to an exhaust flow path 162*b*. Exhaust flow path 162*b* extends through members 151*a*-151*e* where it connects to an exhaust flow path 163*d*. Exhaust flow path 163*d* extends from the end of exhaust flow path 162*b* opposed to exhaust flow path 163*b* to an exhaust flow path 161*c*. Exhaust flow path 161*c* extends through members 151*a*-151*e* where it connects to exhaust pipe 109. Exhaust pipe 109 extends through sidewall 158 and is in fluid communication with exhaust flow path 161*c*.

Exhaust filter 190 can operate as a filtering and heat dissipation element in many different ways. In one embodiment, the solid filtering agent is positioned along exhaust flow paths 161*a*, 161*b* and 161*c* and the heat dissipation material is positioned along exhaust flow paths 162*a* and 162*b*. In another embodiment, the heat dissipation material is positioned along exhaust flow paths 161*a*, 161*b* and 161*c* and the solid filtering agent is positioned along exhaust flow paths 162*a* and 162*b*.

Figure 11A:
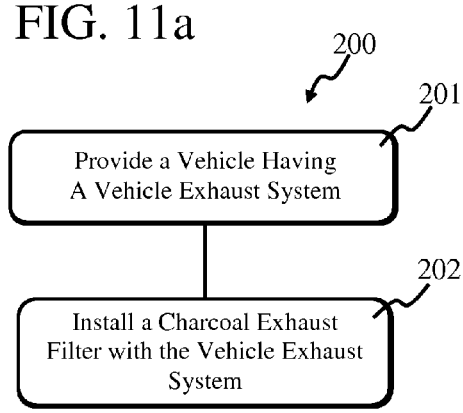
FIG. 11a is a flowchart of a method of installing a charcoal exhaust filter, in accordance with the invention.

FIG. 11*a* is a flowchart of a method 200 of installing an exhaust filter, in accordance with the invention. In this embodiment, method 200 includes a step 201 of providing a vehicle with a vehicle exhaust system and a method 202 of installing the exhaust filter with the vehicle exhaust system. The exhaust filter is coupled with the vehicle exhaust system so that it filters pollutants from exhaust gas generated from the operation of the vehicle. In some embodiments, method 200 includes replacing disposable filter members and heat dissipation members included with the exhaust filter. In some embodiments, the exhaust filter includes charcoal so that it is a charcoal filter.

Figure 11B:
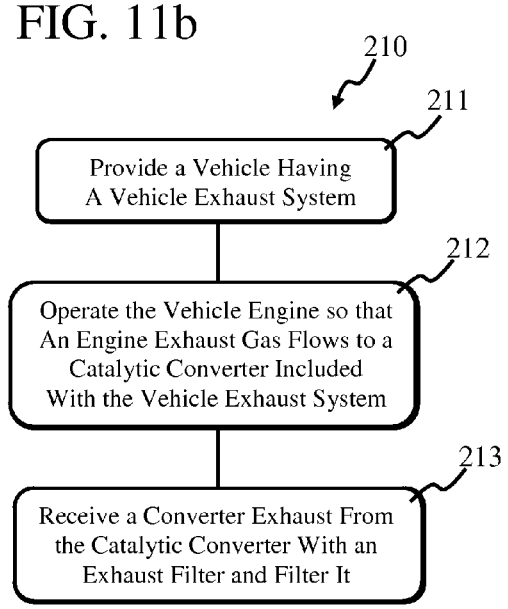
FIG. 11b is a flowchart of a method of reducing the amount of pollution expelled by a vehicle, in accordance with the invention.

FIG. 11*b* is a flowchart of a method 210 of reducing the amount of pollution expelled by a vehicle, in accordance with the invention. In this embodiment, method 210 includes a step 211 of providing a vehicle having an engine coupled with a vehicle exhaust system. The vehicle exhaust system receives exhaust gas from the vehicle and expels it. In accordance with the invention, the vehicle exhaust system includes an exhaust filter in fluid communication with the vehicle engine through a catalytic converter. Method 210 includes a step 212 of operating the vehicle engine so that an engine exhaust gas flows to the catalytic converter. The catalytic converter converts the pollutants included with the vehicle exhaust gas to another chemical species and outputs a converter exhaust. Method 210 includes a step 213 of receiving the converter exhaust with the exhaust filter and outputting a filter exhaust. The filter exhaust includes fewer pollutants than the converter exhaust. In some embodiments, method 210 includes a step of flowing a portion of the converted exhaust to the vehicle engine so that it is used in the combustion process again.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A vehicle exhaust system, comprising:
    an exhaust pipe;
    a catalytic converter connected to the exhaust pipe; and
    a filter connected to the exhaust pipe downstream from the catalytic converter, wherein the filter includes a first hollow body member adjacent to a filter member, the filter member including a second hollow body member positioned between opposed mesh screens, and charcoal positioned between the opposed meshed screens.

2. The system of claim 1, wherein the filter is a charcoal filter.

3. The system of claim 1, wherein the filter is threaded with the exhaust pipe.

4. The system of claim 1, wherein the filter includes two heat resistant material regions spaced from each other by a charcoal filter region.

5. The system of claim 1, wherein the filter includes first and second exhaust flow paths, the first and second exhaust flow paths being in opposed directions and spaced from each other by a sidewall.

6. The system of claim 1, wherein the filter includes filter and heat dissipation members.

7. A vehicle exhaust system, comprising:
    a catalytic converter;
    a disposable filter; and an exhaust pipe connected between the catalytic converter and disposable filter, the disposable filter filtering exhaust from the catalytic converter, wherein the disposable filter includes a first filter member having a flow diverter adjacent to a first hollow body member and a second filter member having a second hollow body member positioned between opposed mesh screens, and charcoal positioned between the opposed meshed screens.

8. The system of claim 7, wherein the filter includes charcoal.

9. The system of claim 8, wherein the charcoal is activated charcoal.

10. The system of claim 7, wherein the filter is threadingly engaged with the exhaust pipe.

11. The system of claim 7, wherein the filter includes two heat resistant material regions spaced from each other by a charcoal filter region.

12. The system of claim 7, wherein the filter includes first and second exhaust flow paths, the first and second exhaust flow paths being in opposed directions.

13. The system of claim 7, wherein the filter includes a flow diverter.

14. A vehicle, comprising:

a catalytic converter which receives an engine exhaust from a vehicle engine; and an exhaust filter which receives a converter exhaust from the catalytic converter and filters it to provide a filter exhaust, wherein the exhaust filter includes a first filter member having a first hollow body member positioned between a first screen and a flow diverter, and a heat dissipation material positioned between the first screen and flow diverter, the exhaust filter including a second filter member having a second hollow body member positioned between opposed mesh screens, and charcoal positioned between the opposed meshed screens.

15. The vehicle of claim 14, further including an exhaust pipe which flows a portion of the converter exhaust to an air intake of the vehicle engine.

16. The vehicle of claim 14, wherein the catalytic converter removes a first amount of particulates from the engine exhaust and the charcoal filter removes a second amount of particulates from the converter exhaust.

17. The vehicle of claim 14, further including a flow rate adjuster which adjusts the flow rate of the converter exhaust.

18. The vehicle of claim 14, wherein the charcoal filter is connected to the exhaust pipe in a repeatably removeable manner.

19. The vehicle of claim 14, wherein the exhaust filter includes charcoal.

20. The vehicle of claim 14, wherein the charcoal filter includes alternating filter regions and heat dissipation material regions.

* * * * *